US012407226B2

(12) United States Patent
Peng

(10) Patent No.: US 12,407,226 B2
(45) Date of Patent: Sep. 2, 2025

(54) WOUND-ROTOR ELECTRIC MACHINE

(71) Applicant: GM Global Technology Operations LLC, Detroit, MI (US)

(72) Inventor: Peng Peng, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 452 days.

(21) Appl. No.: 17/812,823

(22) Filed: Jul. 15, 2022

(65) Prior Publication Data
US 2024/0022141 A1   Jan. 18, 2024

(51) Int. Cl.
*H02K 11/33* (2016.01)
*H02K 3/28* (2006.01)
*H02K 19/10* (2006.01)
*H02K 21/22* (2006.01)

(52) U.S. Cl.
CPC ............... *H02K 11/33* (2016.01); *H02K 3/28* (2013.01); *H02K 19/10* (2013.01); *H02K 21/22* (2013.01)

(58) Field of Classification Search
CPC ........ H02K 17/00; H02K 17/02; H02K 17/12; H02K 17/22; H02K 17/24; H02K 17/30; H02K 17/34; H02K 17/36; H02K 17/40; H02K 17/42; H02K 1/26; H02K 1/265; H02P 9/007; H02P 9/42
See application file for complete search history.

(56) References Cited

U.S. PATENT DOCUMENTS

| 7,821,145 B2 | 10/2010 | Huang et al. | |
| 10,250,175 B2* | 4/2019 | Seguchi | H02K 1/26 |
| 10,790,773 B2* | 9/2020 | Petkanchin | H02P 9/007 |
| 11,368,118 B2* | 6/2022 | Uemura | F25B 31/026 |

(Continued)

FOREIGN PATENT DOCUMENTS

| DE | 102012021161 A1 * | 4/2014 | ............... H02P 1/00 |
| JP | 2021016289 A * | 2/2021 | ............... H02K 17/12 |

(Continued)

OTHER PUBLICATIONS

17812823_2025-01-15_DE_102012021161_A1_H.pdf (Year: 2025).*

(Continued)

*Primary Examiner* — Christopher M Koehler
*Assistant Examiner* — Ahmed F Seck
(74) *Attorney, Agent, or Firm* — Vivacqua Crane, PLLC

(57) ABSTRACT

A system for converting energy includes a doubly-fed induction machine including a rotor having a plurality of rotor windings, and a stator having a plurality of stator windings. The system also includes a power conversion unit in electrical communication with the plurality of rotor windings, where the power conversion unit is configured to excite the plurality of rotor windings with an alternating current. The system also includes a relay unit in electrical communication with the plurality of stator windings, where the relay unit is configured to electrically interconnect a plurality of terminals of the plurality of stator windings. The system also includes a controller in electrical communication with the power conversion unit and the relay unit, where the controller is programmed to adjust an operation of the doubly-fed induction machine using the power conversion unit and the relay unit based on the rotational velocity of the rotor.

19 Claims, 5 Drawing Sheets

(56) References Cited

U.S. PATENT DOCUMENTS

| | | | |
|---|---|---|---|
| 2012/0133142 A1* | 5/2012 | Langel | H02K 7/1838 |
| | | | 290/55 |
| 2015/0364978 A1* | 12/2015 | Petkanchin | H02K 11/0094 |
| | | | 310/71 |
| 2021/0099117 A1 | 4/2021 | Gao et al. | |
| 2021/0167645 A1* | 6/2021 | Nashiki | H02K 19/103 |
| 2021/0316878 A1 | 10/2021 | Huang et al. | |

FOREIGN PATENT DOCUMENTS

| | | | | |
|---|---|---|---|---|
| WO | WO-2021166187 A1 * | 2/2020 | | F25B 49/022 |
| WO | WO-2021037340 A1 * | 3/2021 | | H02P 9/08 |

OTHER PUBLICATIONS

17812823_2025-01-17_JP_2021016289_A_H.pdf (Year: 2025).*
17812823_2025-01-17_WO_2021037340_A1_H.pdf (Year: 2025).*
Meng, et al. "Rotor Position Estimation for Aviation Three-Stage Starter/Generators in the Low-Speed Region Without High-Frequency Signal Injection," IEEE Transactions on Power Electronics, vol. 35, No. 8, Aug. 2020, pp. 8405-8416.
Osama, et al. "A New Inverter Control Scheme for Induction Motor Drives Requiring Wide Speed Range," IEEE Transactions on Industry Applications, vol. 32, No. 4, Aug. 1996, pp. 938-944.
Osama, et al. "Modeling and Analysis of a Wide-Speed-Range Induction Motor Drive Based on Electronic Pole Changing," IEEE Transactions on Industry Applications, vol. 33, No. 5, Oct. 1997, pp. 1177-1184.

\* cited by examiner

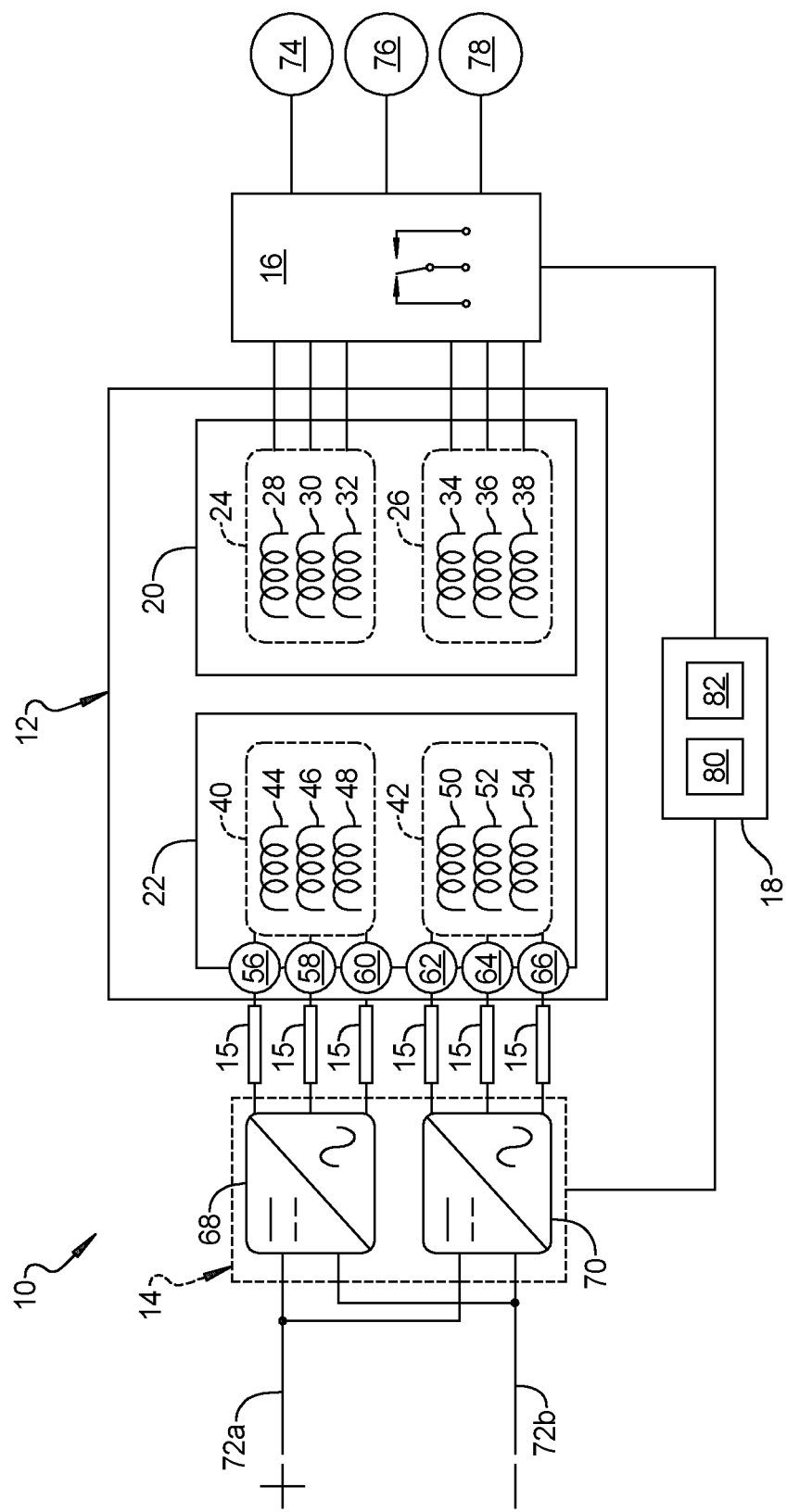

WOUND-ROTOR ELECTRIC MACHINE

INTRODUCTION

The present disclosure relates to a system for converting energy, more specifically, to a narrowband independent-speed variable-frequency electric machine.

To convert energy from mechanical to electrical or electrical to mechanical, electric machines (e.g., generators and motors) have been developed. Often, output power characteristics of electric machines are related to characteristics of the mechanical input. For example, in some electric machines, the frequency of the output power may be proportional to the rotational velocity of the electric machine. Often, specific characteristics of output power are desirable regardless of the characteristics of the mechanical input. For example, in certain applications, it may be desirable to provide output power within a frequency range and with a specific amplitude. However, systems which have been developed to regulate characteristics of output power of electric machines may be large, heavy, and prone to mechanical wear.

Thus, while current systems for converting energy achieve their intended purpose, there is a need for a new and improved system for converting energy.

SUMMARY

According to several aspects, a system for converting energy is provided. The system includes a doubly-fed induction machine including a rotor having a plurality of rotor windings, and a stator having a plurality of stator windings. The system also includes a power conversion unit in electrical communication with the plurality of rotor windings, where the power conversion unit is configured to excite the plurality of rotor windings with an alternating current. The system also includes a relay unit in electrical communication with the plurality of stator windings, where the relay unit is configured to electrically interconnect a plurality of terminals of the plurality of stator windings. The system also includes a controller in electrical communication with the power conversion unit and the relay unit, where the controller is programmed to determine a rotational velocity of the rotor and adjust an operation of the doubly-fed induction machine using the power conversion unit and the relay unit based on the rotational velocity of the rotor.

In another aspect of the present disclosure, the plurality of rotor windings further includes a first three-phase rotor winding having a first rotor winding coil, a second rotor winding coil, and a third rotor winding coil. The plurality of rotor windings further includes a second three-phase rotor winding having a fourth rotor winding coil, a fifth rotor winding coil, and a sixth rotor winding coil. The plurality of stator windings further includes a first three-phase stator winding having a first stator winding coil having a first and second terminal, a second stator winding coil having a first and second terminal, and a third stator winding coil having a first and second terminal. The plurality of stator windings further includes a second three-phase stator winding having a fourth stator winding coil having a first and second terminal, a fifth stator winding coil having a first and second terminal, and a sixth stator winding coil having a first and second terminal. The system further includes a first, second, and third output terminal.

In another aspect of the present disclosure, the power conversion unit further may include a first inverter having three outputs, where each output of the first inverter is in electrical communication with one of the first, second, or third rotor winding coils. The power conversion unit further may include a second inverter having three outputs, where each output of the second inverter is in electrical communication with one of the fourth, fifth, or sixth rotor winding coils. The first inverter and the second inverter are configured to be powered by a direct current (DC) power source.

In another aspect of the present disclosure, the system further includes a slip ring configured to provide electrical communication between each output of the first inverter and one of the first, second, or third rotor winding coils and between each output of the second inverter and one of the fourth, fifth, or sixth rotor winding coils.

In another aspect of the present disclosure, the relay unit further may include a plurality of solid-state relays in electrical communication with the first three-phase stator winding and the second three-phase stator winding.

In another aspect of the present disclosure, to adjust the operation of the doubly-fed induction machine, the controller is further programmed to adjust an excitation frequency of the first three-phase rotor winding using the first inverter and the excitation frequency of the second three-phase rotor winding using the second inverter of the power conversion unit based on the rotational velocity of the rotor to regulate an output voltage frequency when the doubly-fed induction machine is used as a generator.

In another aspect of the present disclosure, to adjust the operation of the doubly-fed induction machine, the controller is further programmed to configure the doubly-fed induction machine to have four effective poles using the power conversion unit and the relay unit based on the rotational velocity of the rotor to regulate an output voltage frequency when the doubly-fed induction machine is used as a generator. To adjust the operation of the doubly-fed induction machine, the controller is further programmed to configure the doubly-fed induction machine to have eight effective poles using the power conversion unit and the relay unit based on the rotational velocity of the rotor to regulate an output voltage frequency when the doubly-fed induction machine is used as a generator.

In another aspect of the present disclosure, to configure the doubly-fed induction machine to have four effective poles, the controller is further programmed to configure the first inverter to excite the first rotor winding coil with a first sinusoidal current, excite the second rotor winding coil with a second sinusoidal current, where the second sinusoidal current lags the first sinusoidal current by 240 degrees, and excite the third rotor winding coil with a third sinusoidal current, where the third sinusoidal current lags the first sinusoidal current by 120 degrees. To configure the doubly-fed induction machine to have four effective poles, the controller is further programmed to configure the second inverter to excite the fourth rotor winding coil with a fourth sinusoidal current, where the fourth sinusoidal current is 180 degrees out of phase with the first sinusoidal current, excite the fifth rotor winding coil with a fifth sinusoidal current, where the fifth sinusoidal current is 180 degrees out of phase with the second sinusoidal current, and excite the sixth rotor winding coil with a sixth sinusoidal current, where the sixth sinusoidal current is 180 degrees out of phase with the third sinusoidal current. To configure the doubly-fed induction machine to have four effective poles, the controller is further programmed to configure the relay unit to electrically connect the first terminal of the first stator winding coil with the second output terminal and the first terminal of the sixth stator winding coil. To configure the doubly-fed induction machine to have four effective poles, the controller is further programmed to configure the relay unit to electrically connect the first terminal of the second stator winding coil with the third output terminal and the first terminal of the fifth stator winding coil. To configure the doubly-fed induction machine to have four effective poles, the controller is further programmed to configure the relay unit to electrically connect the first terminal of the third stator winding coil with the first output terminal and the first terminal of the fourth stator winding coil. To configure the doubly-fed induction machine to have four effective poles, the controller is further programmed to configure the relay unit to electrically connect the second terminal of the fourth stator winding coil to the second terminal of the fifth stator winding coil and the second terminal of the sixth stator winding coil.

In another aspect of the present disclosure, to configure the doubly-fed induction machine to have eight effective poles, the controller is further programmed to configure the first inverter to excite the first rotor winding coil with a first sinusoidal current, excite the second rotor winding coil with a second sinusoidal current, where the second sinusoidal current lags the first sinusoidal current by 120 degrees, and excite the third rotor winding coil with a third sinusoidal current, where the third sinusoidal current lags the second sinusoidal current by 120 degrees. To configure the doubly-fed induction machine to have eight effective poles, the controller is further programmed to configure the second inverter to excite the fourth rotor winding coil with the first sinusoidal current, excite the fifth rotor winding coil with the second sinusoidal current, and excite the sixth rotor winding coil with the third sinusoidal current. To configure the doubly-fed induction machine to have eight effective poles, the controller is further programmed to configure the relay unit to electrically connect the first terminal of the first stator winding coil with the third output terminal and the second terminal of the sixth stator winding coil. To configure the doubly-fed induction machine to have eight effective poles, the controller is further programmed to configure the relay unit to electrically connect the first terminal of the second stator winding coil with the second output terminal and the second terminal of the fifth stator winding coil. To configure the doubly-fed induction machine to have eight effective poles, the controller is further programmed to configure the relay unit to electrically connect the first terminal of the third stator winding coil with the first output terminal and the second terminal of the fourth stator winding coil. To configure the doubly-fed induction machine to have eight effective poles, the controller is further programmed to configure the relay unit to electrically connect the first terminal of the fourth stator winding coil to the first terminal of the fifth stator winding coil and the first terminal of the sixth stator winding coil.

According to several aspects, a system for converting energy is provided. The system includes a doubly-fed induction machine including a rotor having a plurality of rotor windings, and a stator having a plurality of stator windings. The system also includes a power conversion unit in wireless electrical communication with the plurality of rotor windings, where the power conversion unit is configured to excite the plurality of rotor windings with an alternating current. The system also includes a relay unit in electrical communication with the plurality of stator windings, where the relay unit is configured to electrically interconnect a plurality of terminals of the plurality of stator windings. The system also includes a controller in electrical communication with the power conversion unit and the relay unit, where the controller is programmed to determine a rotational velocity of the rotor and adjust an operation of the doubly-fed induction machine using the power conversion unit and the relay unit based on the rotational velocity of the rotor.

In another aspect of the present disclosure, the plurality of rotor windings further includes a first three-phase rotor winding having a first rotor winding coil, a second rotor winding coil, and a third rotor winding coil. The plurality of rotor windings further includes a second three-phase rotor winding having a fourth rotor winding coil, a fifth rotor winding coil, and a sixth rotor winding coil. The plurality of stator windings further includes a first three-phase stator winding having a first stator winding coil having a first and second terminal, a second stator winding coil having a first and second terminal, and a third stator winding coil having a first and second terminal. The plurality of stator windings further includes a second three-phase stator winding having a fourth stator winding coil having a first and second terminal, a fifth stator winding coil having a first and second terminal, and a sixth stator winding coil having a first and second terminal. The system further includes a first, second, and third output terminal.

In another aspect of the present disclosure, the power conversion unit further may include a first inverter having three outputs, where each output of the first inverter is in electrical communication with one of the first, second, or third rotor winding coils. The power conversion unit further may include a second inverter having three outputs, where each output of the second inverter is in electrical communication with one of the fourth, fifth, or sixth rotor winding coils. The first inverter and the second inverter are affixed to the rotor.

In another aspect of the present disclosure, the power conversion unit further may include a wireless power transfer system including a stationary power transfer inverter and a stationary wireless power transfer coil in electrical communication with the stationary power transfer inverter. The wireless power transfer system further includes a rotating power transfer rectifier affixed to the rotor and a rotating wireless power transfer coil affixed to the rotor, where the rotating wireless power transfer coil is in electrical communication with the rotating power transfer rectifier and the first inverter and the second inverter of the power conversion unit. The stationary wireless power transfer coil is inductively coupled to the rotating wireless power transfer coil to transmit power between the stationary power transfer inverter and the rotating power transfer rectifier. The power conversion unit further may include a wireless data transfer system including a stationary wireless data transceiver and a rotating wireless data transceiver affixed to the rotor. The wireless data transfer system further includes a rotating controller affixed to the rotor, where the rotating controller is in electrical communication with the rotating wireless data transceiver and the first inverter and the second inverter of the power conversion unit. The rotating controller is programmed to receive command data from the stationary wireless data transceiver using the rotating wireless data transceiver and adjust an operation of the first inverter and the second inverter of the power conversion unit based at least in part on the command data.

In another aspect of the present disclosure, the relay unit further may include a plurality of solid-state relays in electrical communication with the first three-phase stator winding and the second three-phase stator winding.

In another aspect of the present disclosure, to adjust the operation of the doubly-fed induction machine, the controller is further programmed to adjust an excitation frequency of the first three-phase rotor winding using the first inverter and the excitation frequency of the second three-phase rotor winding using the second inverter of the power conversion unit based on the rotational velocity of the rotor to regulate an output voltage frequency when the doubly-fed induction machine is used as a generator.

In another aspect of the present disclosure, to adjust the operation of the doubly-fed induction machine, the controller is further programmed to configure the doubly-fed induction machine to have four effective poles using the power conversion unit and the relay unit based on the rotational velocity of the rotor to regulate an output voltage frequency when the doubly-fed induction machine is used as a generator. To adjust the operation of the doubly-fed induction machine, the controller is further programmed to configure the doubly-fed induction machine to have eight effective poles using the power conversion unit and the relay unit based on the rotational velocity of the rotor to regulate an output voltage frequency when the doubly-fed induction machine is used as a generator.

In another aspect of the present disclosure, to configure the doubly-fed induction machine to have four effective poles, the controller is further programmed to configure the first inverter to excite the first rotor winding coil with a first sinusoidal current, excite the second rotor winding coil with a second sinusoidal current, where the second sinusoidal current lags the first sinusoidal current by 240 degrees, and excite the third rotor winding coil with a third sinusoidal current, where the third sinusoidal current lags the first sinusoidal current by 120 degrees. To configure the doubly-fed induction machine to have four effective poles, the controller is further programmed to configure the second inverter to excite the fourth rotor winding coil with a fourth sinusoidal current, where the fourth sinusoidal current is 180 degrees out of phase with the first sinusoidal current, excite the fifth rotor winding coil with a fifth sinusoidal current, where the fifth sinusoidal current is 180 degrees out of phase with the second sinusoidal current, and excite the sixth rotor winding coil with a sixth sinusoidal current, where the sixth sinusoidal current is 180 degrees out of phase with the third sinusoidal current. To configure the doubly-fed induction machine to have four effective poles, the controller is further programmed to configure the relay unit to electrically connect the first terminal of the first stator winding coil with the second output terminal and the first terminal of the sixth stator winding coil. To configure the doubly-fed induction machine to have four effective poles, the controller is further programmed to configure the relay unit to electrically connect the first terminal of the second stator winding coil with the third output terminal and the first terminal of the fifth stator winding coil. To configure the doubly-fed induction machine to have four effective poles, the controller is further programmed to configure the relay unit to electrically connect the first terminal of the third stator winding coil with the first output terminal and the first terminal of the fourth stator winding coil. To configure the doubly-fed induction machine to have four effective poles, the controller is further programmed to configure the relay unit to electrically connect the second terminal of the fourth stator winding coil to the second terminal of the fifth stator winding coil and the second terminal of the sixth stator winding coil.

In another aspect of the present disclosure, to configure the doubly-fed induction machine to have eight effective poles, the controller is further programmed to configure the first inverter to excite the first rotor winding coil with a first sinusoidal current, excite the second rotor winding coil with a second sinusoidal current, where the second sinusoidal current lags the first sinusoidal current by 120 degrees, and excite the third rotor winding coil with a third sinusoidal current, where the third sinusoidal current lags the second sinusoidal current by 120 degrees. To configure the doubly-fed induction machine to have eight effective poles, the controller is further programmed to configure the second inverter to excite the fourth rotor winding coil with the first sinusoidal current, excite the fifth rotor winding coil with the second sinusoidal current, and excite the sixth rotor winding coil with the third sinusoidal current. To configure the doubly-fed induction machine to have eight effective poles, the controller is further programmed to configure the relay unit to electrically connect the first terminal of the first stator winding coil with the third output terminal and the second terminal of the sixth stator winding coil. To configure the doubly-fed induction machine to have eight effective poles, the controller is further programmed to configure the relay unit to electrically connect the first terminal of the second stator winding coil with the second output terminal and the second terminal of the fifth stator winding coil. To configure the doubly-fed induction machine to have eight effective poles, the controller is further programmed to configure the relay unit to electrically connect the first terminal of the third stator winding coil with the first output terminal and the second terminal of the fourth stator winding coil. To configure the doubly-fed induction machine to have eight effective poles, the controller is further programmed to configure the relay unit to electrically connect the first terminal of the fourth stator winding coil to the first terminal of the fifth stator winding coil and the first terminal of the sixth stator winding coil.

According to several aspects, an electric machine is provided. The electric machine includes a stator having a hollow cylindrical shape, the stator including a plurality of stator slots disposed at a uniform pitch along a circumference of the stator. The stator further includes a first, second, third, fourth, fifth, and sixth stator coil, where each stator coil has a first stator coil loop electrically connected in series to a second stator coil loop. For each of the first, second, third, fourth, fifth, and sixth stator coil, the first stator coil loop is disposed in a first pair of stator slots, where a second pair of stator slots is disposed between the first pair of stator slots. The second stator coil loop is disposed in a third pair of stator slots, where a fourth pair of stator slots is disposed between the third pair of stator slots, and where the second stator coil loop is diametrically opposed to the first stator coil loop. The electric machine also includes a rotor disposed rotatably inside the stator along a central axis of the stator, the rotor including a plurality of rotor slots disposed at a uniform pitch along a circumference of the rotor. The rotor further includes a first, second, third, fourth, fifth, and sixth rotor coil. Each rotor coil has a first rotor coil loop electrically connected in series to a second rotor coil loop. For each of the first, second, third, fourth, fifth, and sixth rotor coil, the first rotor coil loop is disposed in a first pair of rotor slots, where a second pair of rotor slots is disposed between the first pair of rotor slots. The second rotor coil loop is disposed in a third pair of rotor slots, where a fourth pair of rotor slots is disposed between the third pair of rotor slots, and where the second rotor coil loop is diametrically opposed to the first rotor coil loop.

In another aspect of the present disclosure, The electric machine further includes a controller affixed to an exterior surface of the stator, where the controller is programmed to determine a rotational velocity of the rotor and electrically change a pole number of the rotor and the stator based at least in part on the rotational velocity of the rotor by adjusting a phase angle of each phase of a three-phase current supply electrically connected to the rotor coils and changing a plurality of electrical connections between each of the stator coils.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a block diagram of a system for converting energy according to an exemplary embodiment;

DETAILED DESCRIPTION

Figure 2A:
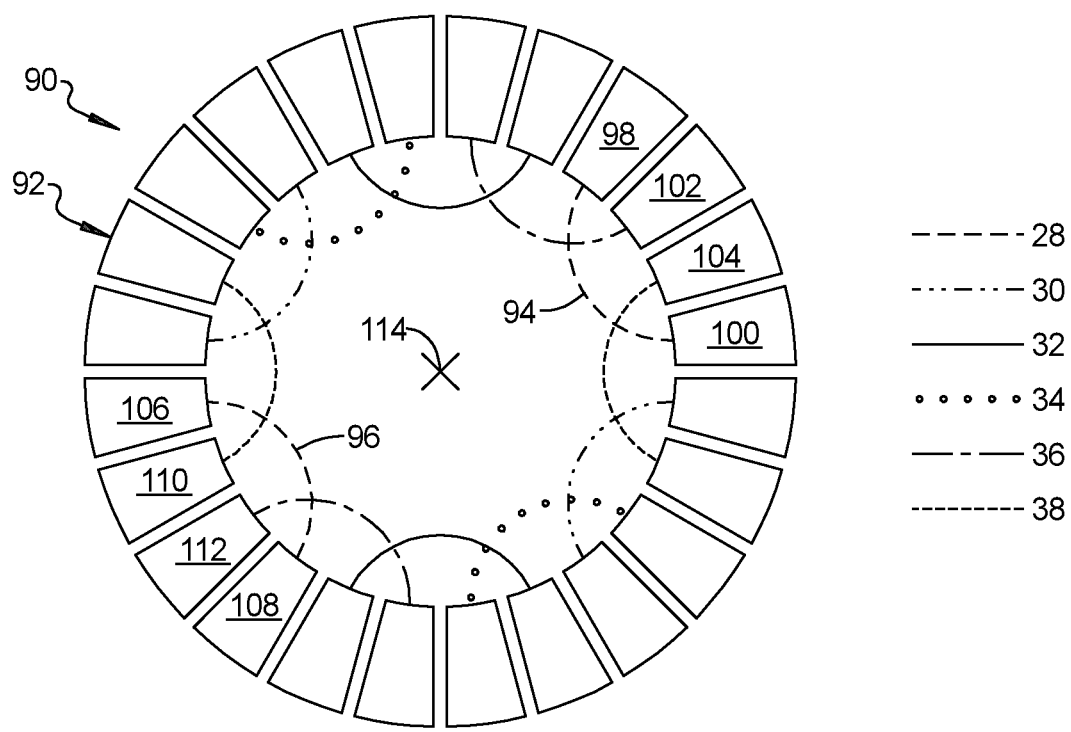
FIG. 2A is a diagram of a winding pattern for a stator of an electric machine according to an exemplary embodiment.

The following description is merely exemplary in nature and is not intended to limit the present disclosure, application, or uses.

Referring to FIG. 1, a block diagram of a system for converting energy is illustrated and generally indicated by reference numeral 10. The system 10 generally includes a doubly-fed induction machine 12, a power conversion unit 14, a plurality of slip rings 15, a relay unit 16, and a controller 18.

The doubly-fed induction machine 12 is used to convert mechanical energy to electrical energy, and/or electrical energy to mechanical energy. The doubly-fed induction machine 12 includes a stator 20 and a rotor 22. The stator 20 has a hollow cylindrical shape, and the rotor 22 has a solid cylindrical shape. The rotor 22 is suspended rotatably along a central axis of the stator 20. The structure of the stator 20 and the rotor 22 will be discussed in further detail in reference to FIG. 2. In a non-limiting example, when the doubly-fed induction machine 12 is used to convert mechanical energy to electrical energy (i.e., as a generator), the rotor 22 is affixed to an source of rotational mechanical energy, such as an internal combustion engine, a jet engine, a wind turbine or the like. In another non-limiting example, when the doubly-fed induction machine 12 is used to convert electrical energy to mechanical energy, stator 20 is electrically connected to a source of electrical energy to rotate the rotor 22 and the rotor 22 is affixed to a mechanical load, and the rotor 22 rotates to provide energy to the mechanical load. In the present disclosure, the term "doubly-fed" means that both the stator 20 and the rotor 22 of the doubly-fed induction machine 12 may supplied with electrical energy.

The stator 20 is a stationary component of the doubly-fed induction machine 12 which converts electrical energy to magnetic field energy and/or magnetic field energy to electrical energy. The stator 20 includes a first three-phase stator winding 24 and a second three-phase stator winding 26. The first three-phase stator winding 24 has a first stator winding coil 28, a second stator winding coil 30, and a third stator winding coil 32. The second three-phase stator winding 26 has a fourth stator winding coil 34, a fifth stator winding coil 36, and a sixth stator winding coil 38. The first three-phase stator winding 24 and the second three-phase stator winding 26 are in electrical communication with the relay unit 16. The electrical connections of the stator 20 will be discussed in more detail in reference to FIGS. 2 and 3. In a non-limiting example, when the three-phase stator windings 24, 26 are in the presence of a changing magnetic field, electric currents are induced in the three-phase stator windings 24, 26, converting the energy of the changing magnetic field to electrical energy. In another non-limiting example, when the three-phase stator windings 24, 26 are excited by a changing electric field, a changing magnetic field is induced near the three-phase stator windings 24, 26, converting the energy of the changing electric field to a changing magnetic field.

The rotor 22 is a rotating component of the doubly-fed induction machine 12 which converts electrical energy to magnetic field energy and/or magnetic field energy to electrical energy. The rotor 22 includes a first three-phase rotor winding 40 and a second three-phase rotor winding 42. The first three-phase rotor winding 40 has a first rotor winding coil 44, a second rotor winding coil 46, and a third rotor winding coil 48. The second three-phase rotor winding 42 has a fourth rotor winding coil 50, a fifth rotor winding coil 52, and a sixth rotor winding coil 54. The first three-phase rotor winding 40 has a first, second, and third winding terminal 56, 58, 60 which are used to connect the first three-phase rotor winding 40 to the power conversion unit 14 using the plurality of slip rings 15. The second three-phase rotor winding 42 has a fourth, fifth, and sixth winding terminal 62, 64, 66 which are used to connect the second three-phase rotor winding 42 to the power conversion unit 14 using the plurality of slip rings 15.

In the exemplary embodiment shown in FIG. 1, the first, second, and third rotor winding coils 44, 46, 48 are connected in a delta configuration. In the delta configuration, a first terminal of the first rotor winding coil 44 is connected to a first terminal of the second rotor winding coil 46, a second terminal of the second rotor winding coil 46 is connected to a first terminal of the third rotor winding coil 48, and a second terminal of the third rotor winding coil 48 is connected to a second terminal of the first rotor winding coil 44. The first winding terminal 56 is connected to the first terminals of the first rotor winding coil 44 and the second rotor winding coil 46. The second winding terminal 58 is connected to the second terminal of the second rotor winding coil 46 and the first terminal of the third rotor winding coil 48. The third winding terminal 60 is connected to the second terminal of the third rotor winding coil and the second terminal of the first rotor winding coil 44. The fourth, fifth, and sixth rotor winding coils 50, 52, 54 are connected to the fourth, fifth, and sixth winding terminals 62, 64, 66 in the same manner as described above for the first, second, and third rotor winding coils 44, 46, 48. In other exemplary embodiments, the rotor winding coils 44, 46, 48, 50, 52, 54 are connected in two wye configurations.

In a non-limiting example, when the three-phase rotor windings 40, 42 are in the presence of a changing magnetic field, electric currents are induced in the three-phase rotor windings 40, 42, converting the energy of the changing magnetic field to electrical energy. In another non-limiting example, when the three-phase rotor windings 40, 42 are excited by a changing electric field, a changing magnetic field is induced near the three-phase rotor windings 40, 42, converting the energy of the changing electric field to a changing magnetic field.

The power conversion unit 14 is used to convert a direct current (DC) power supply 72a, 72b to two three-phase alternating current (AC) power sources and provide a three-phase AC power source to each of the three-phase rotor windings 40, 42. In the exemplary embodiment shown in FIG. 1, the power conversion unit 14 includes a first inverter 68 and a second inverter 70. The inverters 68, 70 convert DC power to AC power and allow control of various characteristics of the AC power by the controller 18. In a non-limiting example, the inverters 68, 70 respond to data signals from the controller 18 by adjusting an amplitude, frequency, and/or phase angle of the AC current and/or voltage output. The inverters 68, 70 are connected to the DC power supply 72a, 72b and provide an AC power to each of the rotor winding terminals 56, 58, 60, 62, 64, 66 using the plurality of slip rings 15. The inverters 68, 70 are also in electrical communication with the controller 18. It should be understood that additional methods of communication between the inverters 68, 70 and the controller 18, including wireless, wired, electrical, optical, and/or opto-electrical communication are within the scope of the present disclosure. In an exemplary embodiment, the inverters 68, 70 are square wave, modified sine wave, pulsed sine wave, pulse width modulated (PWM) wave or pure sine wave inverters. It should be understood that additional types of inverters or other electrical devices designed to convert DC power to AC power are within the scope of the present disclosure.

The plurality of slip rings 15 are used to transmit AC power between the power conversion unit 14 and the rotor 22 of the doubly-fed induction machine 12. The slip rings 15 are electromechanical devices allowing transmission of power from a stationary structure to a rotating structure. In an exemplary embodiment, the slip rings include six conductive rings affixed to the rotor 22 and six conductive contacts affixed to the power conversion unit 14. The conductive contacts make contact with the conductive rings to form six continuous electrical conduction paths between the power conversion unit 14 and the rotor winding terminals 56, 58, 60, 62, 64, 66.

The relay unit 16 is used to switch the electrical connections between the stator winding coils 28, 30, 32, 34, 36, 38 and a first relay unit output 74, a second relay unit output 76, and a third relay unit output 78. An exemplary embodiment of the relay unit 16 and the connections of the relay unit 16 to the stator winding coils 28, 30, 32, 34, 36, 38 will be discussed in greater detail in reference to FIG. 3. The relay unit 16 is in electrical communication with the stator winding coils 28, 30, 32, 34, 36, 38, the controller 18, and the relay unit outputs 74, 76, 78.

The controller 18 is used to control the operation of the doubly-fed induction machine 12 using the power conversion unit 14 and the relay unit 16. The controller 18 includes at least one processor 80 and a non-transitory computer readable storage device or media 82. The processor 80 may be a custom made or commercially available processor, a central processing unit (CPU), a graphics processing unit (GPU), an auxiliary processor among several processors associated with the controller 18, a semiconductor-based microprocessor (in the form of a microchip or chip set), a macroprocessor, a combination thereof, or generally a device for executing instructions. The computer readable storage device or media 82 may include volatile and non-volatile storage in read-only memory (ROM), random-access memory (RAM), and keep-alive memory (KAM), for example. KAM is a persistent or non-volatile memory that may be used to store various operating variables while the processor 80 is powered down. The computer-readable storage device or media 82 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 18 to control the system 10. The controller 18 may also consist of multiple controllers which are in electrical communication with each other.

The controller 18 is in electrical communication with the power conversion unit 14 and the relay unit 16. The media 82 of the controller 18 contains executable instructions to control the operation of the doubly-fed induction machine 12 using the power conversion unit 14 and the relay unit 16.

Referring to FIG. 2A, a diagram of a winding pattern for the stator 20 according to an exemplary embodiment is illustrated and generally indicated by reference numeral 90. In the exemplary embodiment shown in FIG. 2A, the stator 20 is a hollow cylindrical shape having a plurality of stator slots 92 disposed at a uniform pitch along a circumference of the stator 20. In the exemplary embodiment of FIG. 2A, the stator 20 has 24 stator slots 92. It should be understood that alternative embodiments including a different number of stator slots 92 are included within the scope of the present disclosure. The stator winding pattern 90 contains the six stator winding coils 28, 30, 32, 34, 36, 38, each having a first stator coil loop 94 and a second stator coil loop 96 connected in series. It should be understood that alternative embodiments including more than two stator coil loops and/or stator coil loops connected in series and/or parallel are within the scope of the present disclosure. The first and second stator coil loops 94, 96 include a plurality of loops of wire disposed in a pair of the plurality of stator slots 92. For example, the first stator coil loop 94 is disposed in a first stator slot 98 and a second stator slot 100. The first stator slot 98 is separated from the second stator slot 100 by a third stator slot 102 and a fourth stator slot 104. The second stator coil loop 96 is disposed in a fifth stator slot 106 and a sixth stator slot 108. The fifth stator slot 106 is separated from the sixth stator slot 108 by a seventh stator slot 110 and an eighth stator slot 112. Accordingly, the first stator coil loop 94 is diametrically opposed to the second stator coil loop 96. The aforementioned pattern is repeated for each of the stator coil loops of the six stator winding coils 28, 30, 32, 34, 36, 38 as shown in FIG. 2A. The stator 20 has a central axis 114 located at the center of the hollow portion of the stator 20.

Figure 2B:
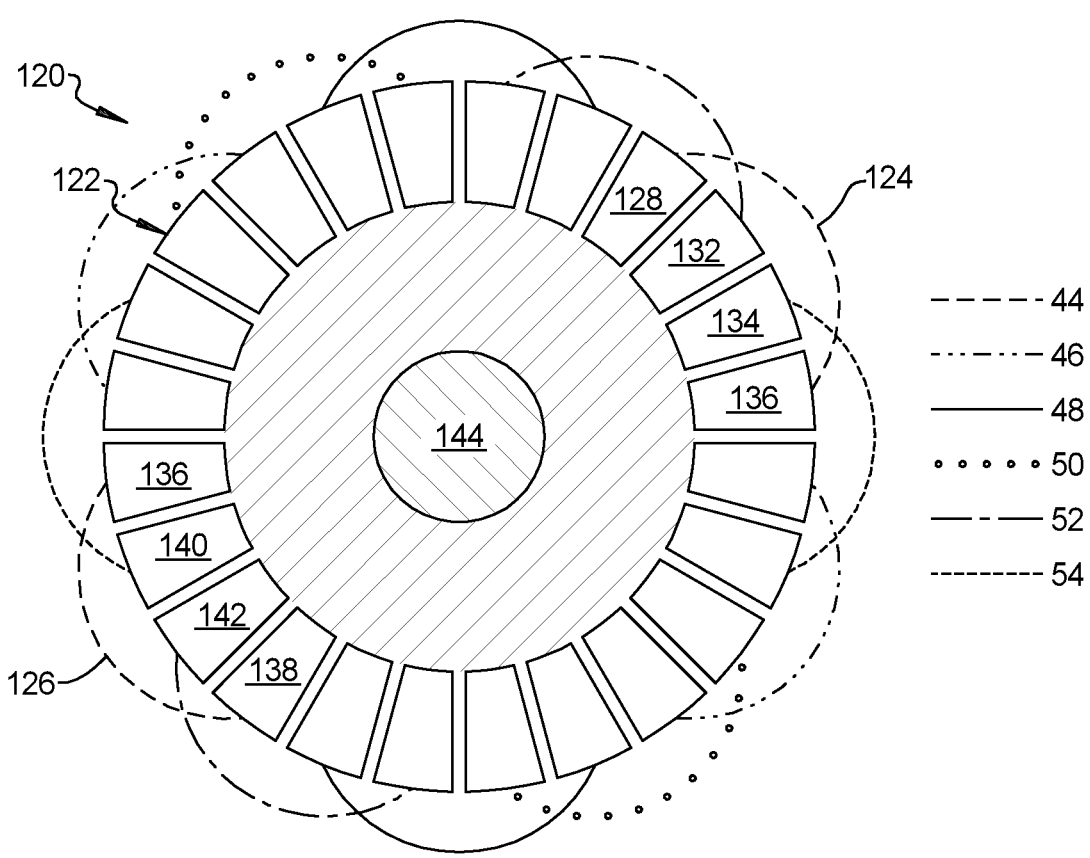
FIG. 2B is a diagram of a winding pattern for a rotor of an electric machine according to an exemplary embodiment.

Referring to FIG. 2B, a diagram of a winding pattern for the rotor 22 according to an exemplary embodiment is illustrated and generally indicated by reference numeral 120. In the exemplary embodiment shown in FIG. 2B, the rotor 22 is a solid cylindrical shape having a plurality of rotor slots 122 disposed at a uniform pitch along a circumference of the rotor 22. The rotor winding pattern 120 contains six rotor winding coils 44, 46, 48, 50, 52, 54, each having a first rotor coil loop 124 and a second rotor coil loop 126. The first and second rotor coil loops 124, 126 are connected in series. It should be understood that alternative embodiments including more than two rotor coil loops and/or rotor coil loops connected in series and/or parallel are within the scope of the present disclosure. The first and second rotor coil loops 124, 126 include a plurality of loops of wire disposed in a pair of the plurality of rotor slots 122. For example, the first rotor coil loop 124 is disposed in a first rotor slot 128 and a second rotor slot 136. The first rotor slot 128 is separated from the second rotor slot 136 by a third rotor slot 132 and a fourth rotor slot 134. The second rotor coil loop 126 is disposed in a fifth rotor slot 136 and a sixth rotor slot 138. The fifth rotor slot 136 is separated from the sixth rotor slot 138 by a seventh rotor slot 140 and an eighth rotor slot 142. The aforementioned pattern is repeated for each of the rotor coil loops of the six rotor winding coils 44, 46, 48, 50, 52, 54. The rotor 22 has a rotor shaft 144 located along a central axis of the rotor 22. The rotor shaft 144 is used to rotatably secure the rotor 22 along the central axis 114 of the stator 20. The rotor shaft 144 is also used to mechanically affix the rotor 22 to a source of mechanical energy or a mechanical load, as discussed above.

Figure 3:
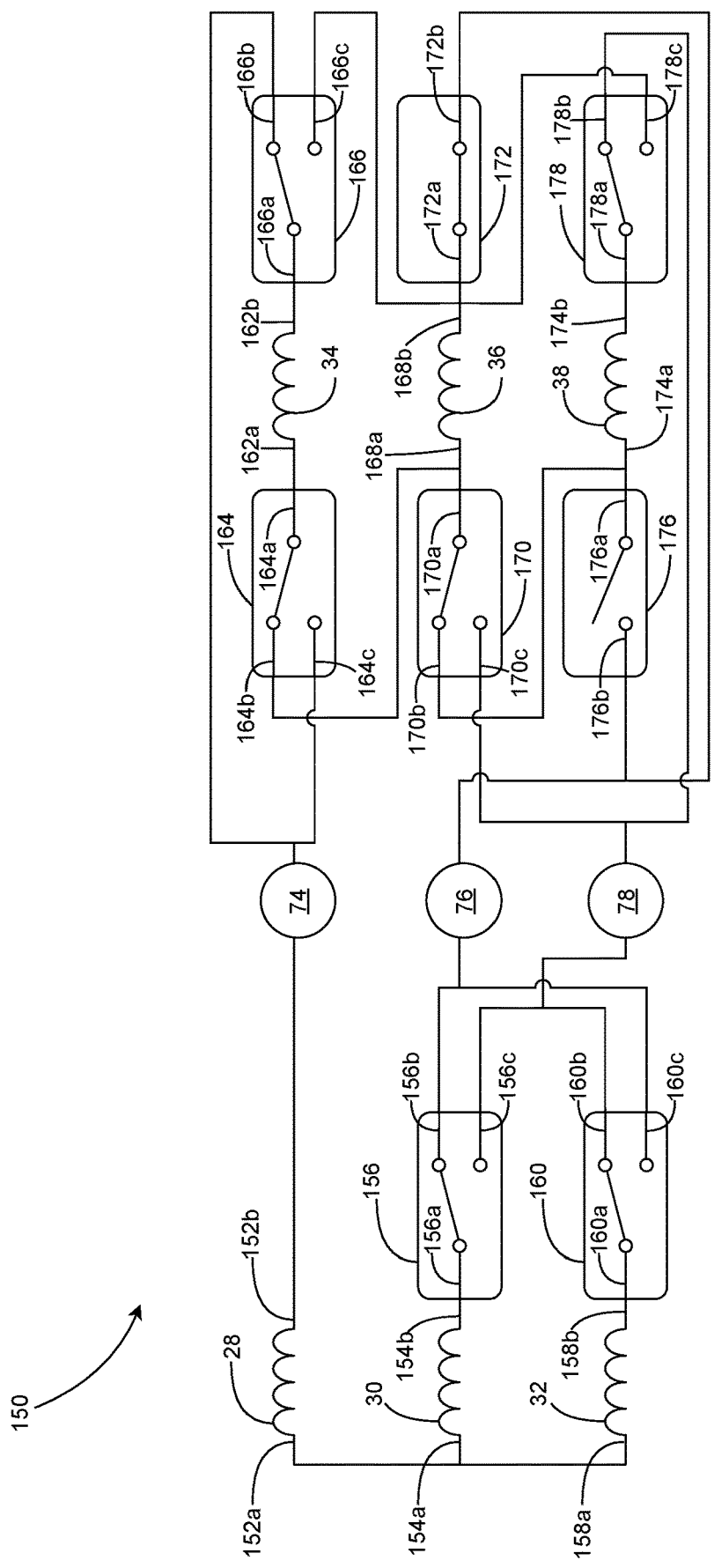
FIG. 3 is a schematic diagram of a relay unit connected to stator windings of an electric machine according to an exemplary embodiment.

Referring to FIG. 3, a schematic diagram of the relay unit 16 connected to the three-phase stator windings 24, 26 according to an exemplary embodiment is illustrated and generally indicated by reference numeral 150. In the exemplary embodiment of FIG. 3, the relay unit 16 contains six single pole, double throw (SPDT) relays 156, 160, 164, 166, 170, 178 and two single pole, single throw (SPST) relays 172, 176. It should be understood that alternative embodiments of the relay unit 16 including alternative configurations, types, and/or number of relays are within the scope of the present disclosure. Furthermore, realizations of the relay unit 16 using electromagnetic relays, solid-state relays, and/or additional types of electronically controllable relays are within the scope of the present disclosure.

The first stator winding coil 28 has a first terminal 152a and a second terminal 152b. The first terminal 152a is connected to the second stator winding coil 30, and the second terminal 152b is connected to the first relay unit output 74. The second stator winding coil 30 has a first terminal 154a and a second terminal 154b. The first terminal 154a is connected to the first terminal 152a of the first stator winding coil 28, and the second terminal 154b is connected to a first relay 156. The third stator winding coil 32 has a first terminal 158a and a second terminal 158b. The first terminal 158a is connected to the first terminal 154a of the second stator winding coil 30, and the second terminal 158b is connected to a second relay 160.

The first relay 156 has a pole terminal 156a, a first switched terminal 156b, and a second switched terminal 156c. The pole terminal 156a is connected to the second terminal 154b of the second stator winding coil 30. The first switched terminal 156b is connected to the second relay unit output 76. The second switched terminal 156c is connected to the third relay unit output 78.

The second relay 160 has a pole terminal 160a, a first switched terminal 160b, and a second switched terminal 160c. The pole terminal 160a is connected to the second terminal 158b of the third stator winding coil 32. The first switched terminal 160b is connected to the third relay unit output 78. The second switched terminal 160c is connected to the second relay unit output 76.

The fourth stator winding coil 34 has a first terminal 162a and a second terminal 162b. The first terminal 162a is connected to a third relay 164, and the second terminal 162b is connected to a fourth relay 166. The fifth stator winding coil 36 has a first terminal 168a and a second terminal 168b. The first terminal 168a is connected to a fifth relay 170, and the second terminal 168b is connected to a sixth relay 172. The sixth stator winding coil 38 has a first terminal 174a and a second terminal 174b. The first terminal 174a is connected to a seventh relay 176, and the second terminal 174b is connected to an eighth relay 178.

The third relay 164 has a pole terminal 164a, a first switched terminal 164b, and a second switched terminal 164c. The pole terminal 164a is connected to the first terminal 162a of the fourth stator winding coil 34. The first switched terminal 164b is connected to first terminal 168a of the fifth stator winding coil 36. The second switched terminal 164c is connected to the first relay unit output 74.

The fourth relay 166 has a pole terminal 166a, a first switched terminal 166b, and a second switched terminal 166c. The pole terminal 166a is connected to the second terminal 162b of the fourth stator winding coil 34. The first switched terminal 166b is connected to the first relay unit output 74. The second switched terminal 166c is connected to the second terminal 168b of the fifth stator winding coil 36.

The fifth relay 170 has a pole terminal 170a, a first switched terminal 170b, and a second switched terminal 170c. The pole terminal 170a is connected to the first terminal 168a of the fifth stator winding coil 36. The first switched terminal 170b is connected to first terminal 174a of the sixth stator winding coil 38. The second switched terminal 170c is connected to the third relay unit output 78.

The sixth relay 172 has a first terminal 172a and a second terminal 172b. The first terminal 172a is connected to second terminal 168b of the fifth stator winding coil 36. The second terminal 172b is connected to the second relay unit output 76.

The seventh relay 176 has a first terminal 176a and a second terminal 176b. The first terminal 176a is connected to the first terminal 174a of the sixth stator winding coil 38. The second terminal 176b is connected to the second relay unit output 76.

The eighth relay 178 has a pole terminal 178a, a first switched terminal 178b, and a second switched terminal 178c. The pole terminal 178a is connected to the second terminal 174b of the sixth stator winding coil 38. The first switched terminal 178b is connected to the second relay unit output 76. The second switched terminal 178c is connected to the second terminal 168b of the fifth stator winding coil 36.

In the exemplary embodiment shown in FIG. 3, the relay unit 16 is configured for 8-pole operation of the doubly-fed induction machine 12. By switching each relay 156, 160, 164, 166, 170, 172, 176, 178 of the relay unit 16, the three-phase stator windings 24, 26 may be connected for 4-pole operation of the doubly-fed induction machine 12, as will be discussed in greater detail below.

Figure 4:
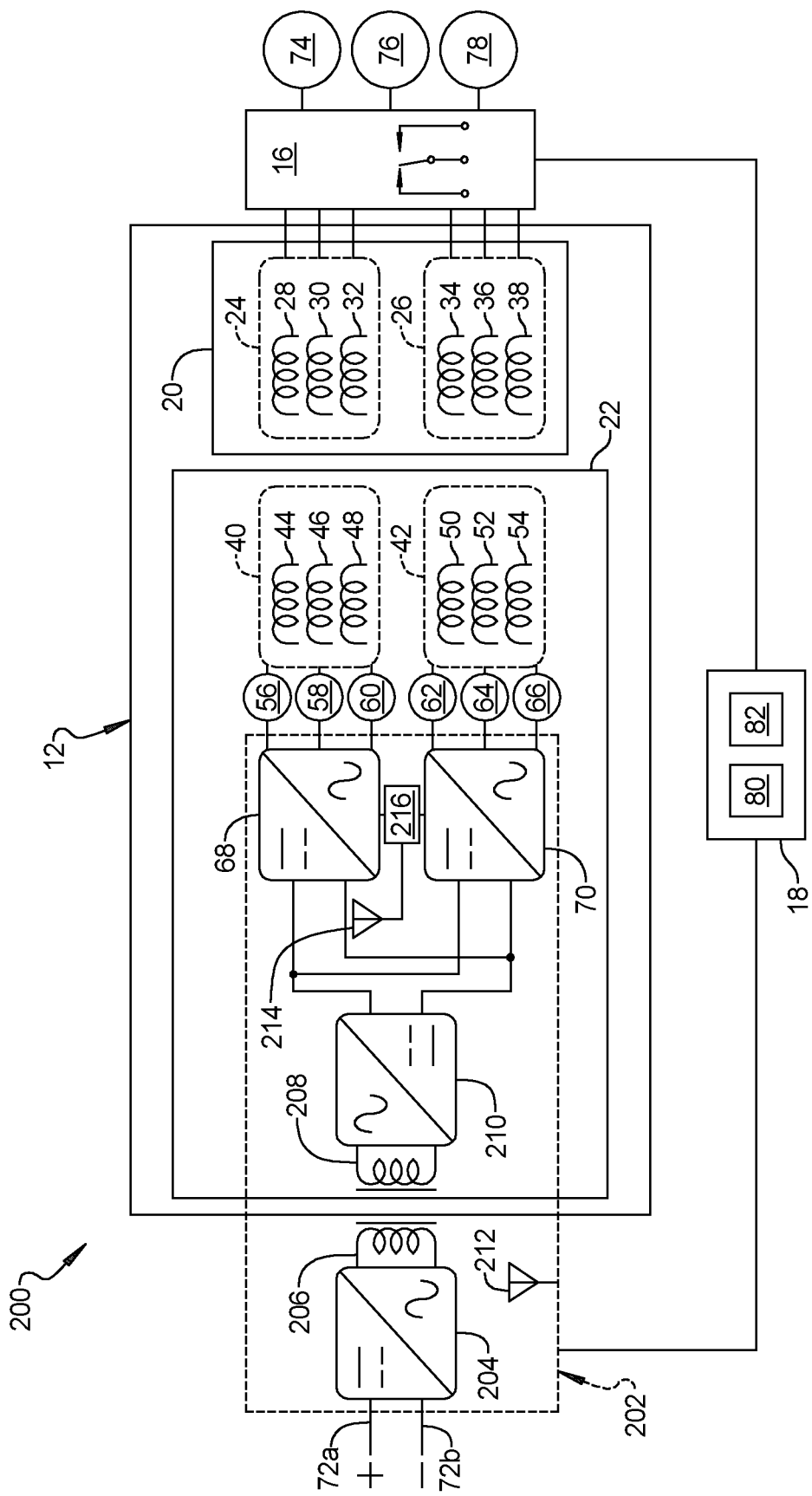
FIG. 4 is a block diagram of an alternate system for converting energy according to an exemplary embodiment.

Referring to FIG. 4, a block diagram of an alternate system for converting energy is illustrated and generally indicated by reference numeral 200. The system 200 is similar to the system 10 shown in FIG. 1 and like components are indicated by like reference numbers. However, in the system 200, the power conversion unit 14 of the system 10 is replaced by an alternate power conversion unit 202.

The alternate power conversion unit 202 is used to convert a direct current (DC) input power source to two three-phase alternating current (AC) output power sources and provide a three-phase AC power source to each of the three-phase rotor windings 40, 42. In the exemplary embodiment shown in FIG. 4, the alternate power conversion unit 202 includes a stationary power transfer inverter 204, a stationary power transfer coil 206, a rotating power transfer coil 208, a rotating power transfer rectifier 210, a first inverter 68, and a second inverter 70. The alternate power conversion unit 202 also includes a stationary wireless data transceiver 212, a rotating wireless data transceiver 214, and a rotating controller 216. The alternate power conversion unit 202 is in electrical communication with the controller 18 and the DC power supply 72a, 72b.

The stationary power transfer inverter 204 is used to convert the DC power supply 72a, 72b to AC power for wireless power transfer using the stationary power transfer coil 206. In an exemplary embodiment, the stationary power transfer inverter 204 is affixed to the stator 20 or an outer casing (not shown) of the doubly-fed induction machine 12 proximal to an end of the rotor 22. The stationary power transfer inverter 204 is a square wave, modified sine wave, pulsed sine wave, pulse width modulated (PWM) wave or pure sine wave inverter. It should be understood that additional types of inverters or other electrical devices designed to convert DC power to AC power are within the scope of the present disclosure. The stationary power transfer inverter 204 is connected to the DC power supply 72a, 72b and the stationary power transfer coil 206.

The stationary power transfer coil 206 is used to wirelessly transfer power from the stationary power transfer inverter 204 to the rotating power transfer rectifier 210. In an exemplary embodiment, the stationary power transfer coil 206 is one coil of a rotary transformer. The stationary power transfer coil 206 is affixed to the stator 20 or an outer casing (not shown) of the doubly-fed induction machine 12 proximal to an end of the rotor 22. The stationary power transfer coil 206 is connected to the stationary power transfer inverter 204, and inductively coupled with the rotating power transfer coil 208. The stationary power transfer coil 206 is excited with a changing electric current by the stationary power transfer inverter 204. The changing electric current induces a changing magnetic field near the stationary power transfer coil 206.

The rotating power transfer coil 208 is used to wirelessly receive power from the stationary power transfer inverter 204 via the stationary power transfer coil 206. In an exemplary embodiment, the rotating power transfer coil 208 is one coil of a rotary transformer. The rotating power transfer coil 208 is affixed to the rotor 22 (e.g., the rotor shaft 144) of the doubly-fed induction machine 12. The rotating power transfer coil 208 is connected to the rotating power transfer rectifier 210, and inductively coupled with the stationary power transfer coil 206. The changing magnetic field induced by the stationary power transfer coil 206 induces an AC power in the rotating power transfer coil 208. The AC power is converted to a DC power by the rotating power transfer rectifier 210.

The rotating power transfer rectifier 210 is used to convert the AC power induced in the rotating power transfer coil 208 to DC power. In an exemplary embodiment, the rotating power transfer rectifier 210 is affixed to the rotor 22 (e.g., the rotor shaft 144) of the doubly-fed induction machine 12. The rotating power transfer rectifier 210 is a rectifier, for example, a controlled rectifier, an uncontrolled rectifier, a half-wave rectifier, a full-wave rectifier, and/or a bridge rectifier. It should be understood that additional types of rectifiers or other electrical devices designed to convert AC power to DC power are within the scope of the present disclosure. The rotating power transfer rectifier 210 is connected to the rotating power transfer coil 208 and the first and second inverters 68, 70.

In an alternative exemplary embodiment, capacitive coupling may be used instead of inductive coupling to transfer power from the stationary power transfer inverter 204 to the rotating power transfer rectifier 210. In the aforementioned alternative exemplary embodiment, a stationary conductive electrode (not shown) is affixed to the stator 20 or an outer casing (not shown) of the doubly-fed induction machine 12 proximal to an end of the rotor 22 and electrically connected to the stationary power transfer inverter 204. A rotating conductive electrode (not shown) is affixed to the rotor 22 (e.g., the rotor shaft 144) of the doubly-fed induction machine 12 and is electrically connected to the rotating power transfer rectifier 210. The stationary conductive electrode and the rotating conductive electrode are capacitively coupled, allowing for wireless power transmission between the stationary power transfer inverter 204 and the rotating power transfer rectifier 210.

The inverters 68, 70 convert DC power to AC power and allow control of various characteristics of the AC power by the controller 18. In a non-limiting example, the inverters 68, 70 are affixed to the rotor 22 (e.g., the rotor shaft 144) of the doubly-fed induction machine 12. The inverters 68, 70 respond to data signals from the rotating controller 216 by adjusting an amplitude, frequency, and/or phase angle of the AC current and/or voltage output. The inverters 68, 70 receive DC power from the rotating power transfer rectifier 210 and provide an AC power to each of the rotor winding terminals 56, 58, 60, 62, 64, 66. The inverters 68, 70 are also in electrical communication with the rotating controller 216. In an exemplary embodiment, the inverters 68, 70 are square wave, modified sine wave, pulsed sine wave, pulse width modulated (PWM) wave or pure sine wave inverters. It should be understood that additional types of inverters or other electrical devices designed to convert DC power to AC power are within the scope of the present disclosure.

The stationary wireless data transceiver 212 is used to transmit data from the controller 18 to the rotating controller 216. In an exemplary embodiment, the stationary wireless data transceiver 212 is affixed to the stator 20 or an outer casing (not shown) of the doubly-fed induction machine 12 proximal to an end of the rotor 22. In another exemplary embodiment, the stationary wireless data transceiver 212 is located within the controller 18. The stationary wireless data transceiver 212 is a device capable of wirelessly transmitting and receiving data, for example, a WiFi transceiver, a Bluetooth transceiver, a radio-frequency transceiver, and/or the like. It should be understood that various additional types and protocols of wireless data transmission are within the scope of the present disclosure.

The rotating wireless data transceiver 214 is used by the rotating controller 216 to receive data from the controller 18. In an exemplary embodiment, the rotating wireless data transceiver 214 is affixed to the rotor 22 (e.g., the rotor shaft 144) of the doubly-fed induction machine 12. In another exemplary embodiment, the rotating wireless data transceiver 214 is located within the rotating controller 216. The rotating wireless data transceiver 214 is a device capable of wirelessly transmitting and receiving data, for example, a WiFi transceiver, a Bluetooth transceiver, a radio-frequency transceiver, and/or the like. It should be understood that various additional types and protocols of wireless data transmission are within the scope of the present disclosure.

The rotating controller 216 is used to process and take action based on data received by the rotating wireless data transceiver 214. The rotating controller 216 is analogous to the controller 18, and likewise contains a processor (not shown) and media (not shown) as discussed above in reference to the controller 18. The rotating controller 216 is in electrical communication with the rotating wireless data transceiver 214, the first inverter 68, and the second inverter 70. In a non-limiting example, the rotating controller 216 may receive data from the controller 18 with instructions to adjust an amplitude, frequency, and/or phase angle of the AC current and/or voltage output of the first and second inverters 68, 70.

In an exemplary embodiment, the system 10 and/or the system 200 is used as an aviation generator in an airliner. The rotor shaft 144 is mechanically affixed to a rotating member of a jet engine of the airliner, providing rotational energy to the rotor 22. A DC power source of the airliner provides the DC power source 72a, 72b for the power conversion unit 14 and/or the alternate power conversion unit 202. The relay unit outputs 74, 76, 78 are connected to a three-phase AC power system of the airliner having multiple electrical loads. It is advantageous for the three-phase AC power system to be supplied with power having a narrow frequency band. A rotational velocity of the jet engine and thus a rotational velocity of the rotor shaft 144 may vary during operation of the airliner, thus the operation of the doubly-fed induction machine 12 must be adjusted to regulate a voltage magnitude and frequency of the output power.

To regulate the voltage magnitude of the output power, the controller 18 communicates with the inverters 68, 70 to increase or decrease an excitation current magnitude of the three-phase rotor windings 40, 42, thereby regulating the voltage magnitude of the output power.

To regulate the frequency of the output power, the media 82 of the controller 18 contains software instructions (i.e., the controller 18 is programmed) to determine a rotational velocity of the rotor shaft 144 and adjust the operation of the doubly-fed induction machine 12 based on the rotational velocity of the rotor shaft 144. In a non-limiting example, the rotational velocity of the rotor shaft 144 is determined using a resolver, which is a rotary transformer used for measuring degrees of rotation. In another non-limiting example, the rotational velocity of the rotor shaft 144 is determined using a rotary or pulse encoder. It should be understood that various additional devices and methods which may be used by the controller 18 to determine the rotational velocity of the rotor shaft 144 are within the scope of the present disclosure.

To adjust the operation of the doubly-fed induction machine 12 based on the rotational velocity of the rotor shaft 144, the media 82 of the controller 18 contains software instructions (i.e., the controller 18 is programmed) to adjust an excitation frequency of the three-phase rotor windings 40, 42 and/or adjust a pole number (i.e., a number of magnetic poles induced by electrical current flow through the three-phase rotor windings 40, 42) of the doubly-fed induction machine 12. To adjust the excitation frequency of the three-phase rotor windings 40, 42, the controller 18 communicates with the inverters 68, 70 of the power conversion unit 14 and/or the alternate power conversion unit 202 using a wired or wireless communication method as discussed above to command the inverters 68, 70 to increase or decrease the excitation frequency of the three-phase rotor windings 40, 42. To adjust the pole number, the controller 18 communicates with the inverters 68, 70 of the power conversion unit 14 and/or the alternate power conversion unit 202 using a wired or wireless communication method as discussed above to command the inverters 68, 70 to adjust a plurality of phase angles of the excitation of the three-phase rotor windings 40, 42. The controller 18 additionally communicates with the relay unit 16 to connect the three-phase stator windings 24, 26 for 8-pole or 4-pole operation of the doubly-fed induction machine 12, as described above.

Figure 5:
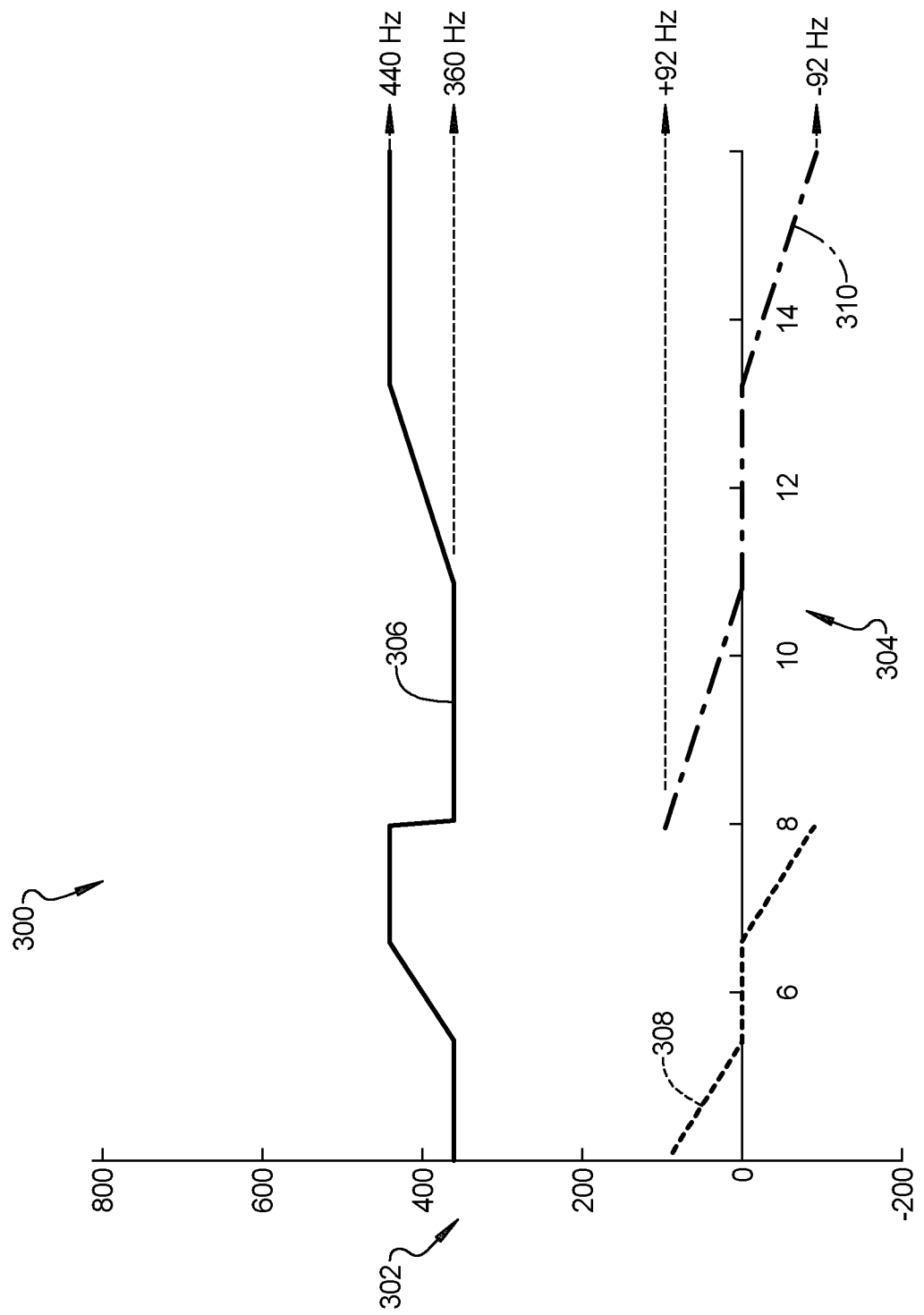
FIG. 5 is a graph of a mode of operation of a system for converting energy according to an exemplary embodiment.

Referring to FIG. 5, a graph of a mode of operation of the system 10 and/or the system 200 according to an exemplary embodiment is illustrated and generally indicated by reference numeral 300. The vertical axis 302 of the graph 300 indicates electrical frequency in units of hertz (Hz). The horizontal axis 304 of the graph 300 indicates the rotational velocity of the rotor shaft 144 in units of thousands of revolutions per minute (krpm). The first line 306 is the frequency of the output power as a function of the rotational velocity of the rotor shaft 144. The second line 308 is the excitation frequency of the three-phase rotor windings 40, 42 with the doubly-fed induction machine 12 operating in 8-pole mode. The third line 310 is the excitation frequency of the three-phase rotor windings 40, 42 with the doubly-fed induction machine 12 operating in 4-pole mode. For the second line 308 and the third line 310, a negative excitation frequency means that the magnetic field generated by the three-phase rotor windings 40, 42 is rotating in the opposite direction of the mechanical rotation of the rotor shaft 144.

In an exemplary embodiment, the excitation frequency of the three-phase rotor windings 40, 42 and the pole number with which to operate the doubly-fed induction machine 12 are determined using the following formula:

$$f_{stator\ windings} = f_{rotor\ windings} + \frac{P * V_R}{120}$$

wherein $f_{stator\ windings}$ is the frequency of the output power (i.e., first line 306), $f_{rotor\ windings}$ is the excitation frequency of the three-phase rotor windings 40, 42 (i.e., the second line 308 and the third line 310), P is the pole number of the doubly-fed induction machine 12 (e.g., 4 or 8), and $V_R$ is the rotational velocity of the rotor shaft 144 in units of revolutions per minute (rpm).

In the exemplary embodiment depicted by FIG. 5, the pole number is switched from 8-pole to 4-pole when the rotor shaft 144 is rotating at 8 krpm. It should be understood that alternative embodiments may use other pole-switching combinations (e.g., 12-pole to 6-pole or 4-pole to 2-pole). To operate the doubly-fed induction machine 12 in 8-pole mode, the controller 18 commands the inverters 68, 70 to excite the first rotor winding coil 44 and the fourth rotor winding coil 50 with a first sinusoidal current, the second rotor winding coil 46 and the fifth rotor winding coil 52 with a second sinusoidal current, and the third rotor winding coil 48 and the sixth rotor winding coil 54 with a third sinusoidal current. The second sinusoidal current lags the first sinusoidal current by 120 degrees. The third sinusoidal current lags the second sinusoidal current by 120 degrees. The controller 18 additionally commands the relay unit 16 to connect the three-phase stator windings 24, 26 for 8-pole operation.

To configure the relay unit 16 for 8-pole operation, the first relay 156 connects the pole terminal 156a to the first switched terminal 156b. The second relay 160 connects the pole terminal 160a to the first switched terminal 160b. The third relay 164 connects the pole terminal 164a to the first switched terminal 164b. The fourth relay 166 connects the pole terminal 166a to the first switched terminal 166b. The fifth relay 170 connects the pole terminal 170a to the first switched terminal 170b. The sixth relay 172 connects the first terminal 172a to the second terminal 172b. The seventh relay 176 disconnects the first terminal 176a from the second terminal 176b. The eighth relay 178 connects the pole terminal 178a to the first switched terminal 178b.

To operate the doubly-fed induction machine 12 in 4-pole mode, the controller 18 commands the first inverter 68 to excite the first rotor winding coil 44 with a fourth sinusoidal current, the second rotor winding coil 46 with a fifth sinusoidal current, and the third rotor winding coil 48 with a sixth sinusoidal current. The controller 18 additionally commands the second inverter 70 to excite the fourth rotor winding coil 50 with a seventh sinusoidal current, the fifth rotor winding coil 52 with an eighth sinusoidal current, and the sixth rotor winding coil 54 with a ninth sinusoidal current. The fifth sinusoidal current lags the fourth sinusoidal current by 240 degrees. The sixth sinusoidal current lags the fourth sinusoidal current by 120 degrees. The seventh sinusoidal current is out of phase with the fourth sinusoidal current by 180 degrees. The eighth sinusoidal current is out of phase with the fifth sinusoidal current by 180 degrees. The ninth sinusoidal current is out of phase with the sixth sinusoidal current by 180 degrees. The controller 18 additionally commands the relay unit 16 to connect the three-phase stator windings 24, 26 for 4-pole operation.

To configure the relay unit 16 for 4-pole operation, the first relay 156 connects the pole terminal 156a to the second switched terminal 156c. The second relay 160 connects the pole terminal 160a to the second switched terminal 160c. The third relay 164 connects the pole terminal 164a to the second switched terminal 164c. The fourth relay 166 connects the pole terminal 166a to the second switched terminal 166c. The fifth relay 170 connects the pole terminal 170a to the second switched terminal 170c. The sixth relay 172 disconnects the first terminal 172a from the second terminal 172b. The seventh relay 176 connects the first terminal 176a to the second terminal 176b. The eighth relay 178 connects the pole terminal 178a to the second switched terminal 178c.

In an additional exemplary embodiment, the doubly-fed induction machine 12 is used as a motor to provide rotational energy to the jet engine of the airliner during a startup process of the jet engine. In additional exemplary embodiments, the system 10 or the system 200 is used in a vehicle, such as an automobile, and the rotor shaft 144 is connected to a drivetrain of the automobile (e.g., using a transmission, a gearbox, and/or other means of transferring mechanical power). It should be understood that additional uses of the system 10, 200 and/or the doubly-fed induction machine 12 to convert energy are included in the scope of the present disclosure.

The system 10, 200 of the present disclosure offers several advantages. When used as a generator, the frequency of the output power can be tightly regulated. In the exemplary embodiment depicted in FIG. 5, the output frequency remains between 360 Hz and 440 Hz over a large range of velocities of the rotor shaft 144. Additionally, because the excitation frequency of the three-phase rotor windings 40, 42 is much lower than the frequency of the power induced on the three-phase stator windings 24, 26, the inverters 68, 70 need only be rated for a fraction of the power output of the systems 10, 200 as given by the following formula:

$$\frac{P_{stator\ windings}}{P_{rotor\ windings}} = \frac{f_{stator\ windings}}{f_{rotor\ windings}}$$

where $P_{stator\ windings}$ is the power generated at the three-phase stator windings 24, 26, $P_{rotor\ windings}$ is the power supplied to the three-phase rotor windings 40, 42, $f_{stator\ windings}$ is the frequency of the output power, and $f_{rotor\ windings}$ is the excitation frequency of the rotor windings 40, 42.

Additionally, the systems 10, 200 may be immediately de-energized in an emergency situation by disabling the inverters 68, 70. Disabling the inverters 68, 70 will stop the generation of power even if the rotor 22 is still rotating.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for converting energy, the system comprising:
   a doubly-fed induction machine including:
      a rotor having a plurality of rotor windings; and
      a stator having a plurality of stator windings;
   a power conversion unit in electrical communication with the plurality of rotor windings, wherein the power conversion unit is configured to excite the plurality of rotor windings with an alternating current;
   a relay unit in electrical communication with the plurality of stator windings, wherein the relay unit is configured to electrically interconnect a plurality of terminals of the plurality of stator windings; and
   a controller in electrical communication with the power conversion unit and the relay unit, wherein the controller is programmed to:
      determine a rotational velocity of the rotor; and
      adjust an operation of the doubly-fed induction machine based on the rotational velocity of the rotor by using the power conversion unit to excite the plurality of rotor windings with one of: a first phase configuration to provide a first quantity of effective poles and a second phase configuration to provide a second quantity of effective poles and by using the relay unit to electrically interconnect one or more of the plurality of terminals of the plurality of stator windings in one of: a first connection configuration to provide the first quantity of effective poles and a second connection configuration to provide the second quantity of effective poles.

2. The system of claim 1, wherein:
   the plurality of rotor windings further includes:
      a first three-phase rotor winding having a first rotor winding coil, a second rotor winding coil, and a third rotor winding coil; and
      a second three-phase rotor winding having a fourth rotor winding coil, a fifth rotor winding coil, and a sixth rotor winding coil;
   the plurality of stator windings further includes:
      a first three-phase stator winding having a first stator winding coil having a first and second terminal, a second stator winding coil having a first and second terminal, and a third stator winding coil having a first and second terminal; and
      a second three-phase stator winding having a fourth stator winding coil having a first and second terminal, a fifth stator winding coil having a first and second terminal, and a sixth stator winding coil having a first and second terminal; and
   the system further includes:
      a first, second, and third output terminal.

3. The system of claim 2, wherein the power conversion unit further comprises:
   a first inverter having three outputs, wherein each output of the first inverter is in electrical communication with one of the first, second, or third rotor winding coils;

a second inverter having three outputs, wherein each output of the second inverter is in electrical communication with one of the fourth, fifth, or sixth rotor winding coils; and wherein the first inverter and the second inverter are configured to be powered by a direct current (DC) power source.

4. The system of claim 3 further comprising:
a slip ring configured to provide electrical communication between each output of the first inverter and one of the first, second, or third rotor winding coils and between each output of the second inverter and one of the fourth, fifth, or sixth rotor winding coils.

5. The system of claim 3, wherein the relay unit further comprises:
a plurality of solid-state relays in electrical communication with the first three-phase stator winding and the second three-phase stator winding.

6. The system of claim 3, wherein to adjust the operation of the doubly-fed induction machine, the controller is further programmed to:
adjust an excitation frequency of the first three-phase rotor winding using the first inverter and the excitation frequency of the second three-phase rotor winding using the second inverter of the power conversion unit based on the rotational velocity of the rotor to regulate an output voltage frequency when the doubly-fed induction machine is used as a generator.

7. The system of claim 3, wherein to adjust the operation of the doubly-fed induction machine, the controller is further programmed to:
configure the doubly-fed induction machine to have four effective poles using the power conversion unit and the relay unit based on the rotational velocity of the rotor to regulate an output voltage frequency when the doubly-fed induction machine is used as a generator; and
configure the doubly-fed induction machine to have eight effective poles using the power conversion unit and the relay unit based on the rotational velocity of the rotor to regulate an output voltage frequency when the doubly-fed induction machine is used as a generator.

8. The system of claim 7, wherein to configure the doubly-fed induction machine to have four effective poles, the controller is further programmed to:
configure the first inverter to:
excite the first rotor winding coil with a first sinusoidal current;
excite the second rotor winding coil with a second sinusoidal current, wherein the second sinusoidal current lags the first sinusoidal current by 240 degrees;
excite the third rotor winding coil with a third sinusoidal current, wherein the third sinusoidal current lags the first sinusoidal current by 120 degrees;
configure the second inverter to:
excite the fourth rotor winding coil with a fourth sinusoidal current, wherein the fourth sinusoidal current is 180 degrees out of phase with the first sinusoidal current;
excite the fifth rotor winding coil with a fifth sinusoidal current, wherein the fifth sinusoidal current is 180 degrees out of phase with the second sinusoidal current;
excite the sixth rotor winding coil with a sixth sinusoidal current, wherein the sixth sinusoidal current is 180 degrees out of phase with the third sinusoidal current; and
configure the relay unit to:
electrically connect the first terminal of the first stator winding coil with the second output terminal and the first terminal of the sixth stator winding coil;
electrically connect the first terminal of the second stator winding coil with the third output terminal and the first terminal of the fifth stator winding coil;
electrically connect the first terminal of the third stator winding coil with the first output terminal and the first terminal of the fourth stator winding coil; and
electrically connect the second terminal of the fourth stator winding coil to the second terminal of the fifth stator winding coil and the second terminal of the sixth stator winding coil.

9. The system of claim 7, wherein configure the doubly-fed induction machine to have eight effective poles, the controller is further programmed to:
configure the first inverter to:
excite the first rotor winding coil with a first sinusoidal current;
excite the second rotor winding coil with a second sinusoidal current, wherein the second sinusoidal current lags the first sinusoidal current by 120 degrees;
excite the third rotor winding coil with a third sinusoidal current, wherein the third sinusoidal current lags the second sinusoidal current by 120 degrees;
configure the second inverter to:
excite the fourth rotor winding coil with the first sinusoidal current;
excite the fifth rotor winding coil with the second sinusoidal current;
excite the sixth rotor winding coil with the third sinusoidal current; and
configure the relay unit to:
electrically connect the first terminal of the first stator winding coil with the third output terminal and the second terminal of the sixth stator winding coil;
electrically connect the first terminal of the second stator winding coil with the second output terminal and the second terminal of the fifth stator winding coil
electrically connect the first terminal of the third stator winding coil with the first output terminal and the second terminal of the fourth stator winding coil; and
electrically connect the first terminal of the fourth stator winding coil to the first terminal of the fifth stator winding coil and the first terminal of the sixth stator winding coil.

10. A system for converting energy for a vehicle, the system comprising:
a doubly-fed induction machine including:
a rotor having a plurality of rotor windings, wherein the plurality of rotor windings further includes a first three-phase rotor winding having a first rotor winding coil, a second rotor winding coil, and a third rotor winding coil and a second three-phase rotor winding having a fourth rotor winding coil, a fifth rotor winding coil, and a sixth rotor winding coil; and
a stator having a plurality of stator windings;
a power conversion unit in electrical communication with the plurality of rotor windings, the power conversion unit further comprising:

a first inverter having three outputs, wherein each output of the first inverter is in electrical communication with one of the first, second, or third rotor winding coils; and a second inverter having three outputs, wherein each output of the second inverter is in electrical communication with one of the fourth, fifth, or sixth rotor winding coils;

a relay unit in electrical communication with the plurality of stator windings; and a controller in electrical communication with the power conversion unit and the relay unit, wherein the controller is programmed to:

determine a rotational velocity of the rotor;

adjust an operation of the doubly-fed induction machine using the power conversion unit and the relay unit based on the rotational velocity of the rotor, wherein to adjust the operation of the doubly-fed induction machine, the controller is further programmed to:

configure the doubly-fed induction machine to have four effective poles using the power conversion unit by:

configuring the first inverter to excite the first rotor winding coil with a first sinusoidal current, excite the second rotor winding coil with a second sinusoidal current, wherein the second sinusoidal current lags the first sinusoidal current by 240 degrees, excite the third rotor winding coil with a third sinusoidal current, wherein the third sinusoidal current lags the first sinusoidal current by 120 degrees; and configuring the second inverter to excite the fourth rotor winding coil with a fourth sinusoidal current, wherein the fourth sinusoidal current is 180 degrees out of phase with the first sinusoidal current, excite the fifth rotor winding coil with a fifth sinusoidal current, wherein the fifth sinusoidal current is 180 degrees out of phase with the second sinusoidal current, and excite the sixth rotor winding coil with a sixth sinusoidal current, wherein the sixth sinusoidal current is 180 degrees out of phase with the third sinusoidal current.

11. The system of claim 10, wherein:

the plurality of stator windings further includes:

a first three-phase stator winding having a first stator winding coil having a first and second terminal, a second stator winding coil having a first and second terminal, and a third stator winding coil having a first and second terminal; and a second three-phase stator winding having a fourth stator winding coil having a first and second terminal, a fifth stator winding coil having a first and second terminal, and a sixth stator winding coil having a first and second terminal; and the system further includes:

a first, second, and third output terminal.

12. The system of claim 11 wherein the first inverter and the second inverter are affixed to the rotor, and wherein the power conversion unit further comprises:

a wireless power transfer system including:

a stationary power transfer inverter;

a stationary wireless power transfer coil in electrical communication with the stationary power transfer inverter;

a rotating power transfer rectifier affixed to the rotor;

a rotating wireless power transfer coil affixed to the rotor, wherein the rotating wireless power transfer coil is in electrical communication with the rotating power transfer rectifier and the first inverter and the second inverter of the power conversion unit; and wherein the stationary wireless power transfer coil is inductively coupled to the rotating wireless power transfer coil to transmit power between the stationary power transfer inverter and the rotating power transfer rectifier; and a wireless data transfer system including:

a stationary wireless data transceiver;

a rotating wireless data transceiver affixed to the rotor; and a rotating controller affixed to the rotor, wherein the rotating controller is in electrical communication with the rotating wireless data transceiver and the first inverter and the second inverter of the power conversion unit, and wherein the rotating controller is programmed to:

receive command data from the stationary wireless data transceiver using the rotating wireless data transceiver; and adjust an operation of the first inverter and the second inverter of the power conversion unit based at least in part on the command data.

13. The system of claim 11, wherein the relay unit further comprises:

a plurality of solid-state relays in electrical communication with the first three-phase stator winding and the second three-phase stator winding.

14. The system of claim 11, wherein to adjust the operation of the doubly-fed induction machine, the controller is further programmed to:

adjust an excitation frequency of the first three-phase rotor winding using the first inverter and the excitation frequency of the second three-phase rotor winding using the second inverter of the power conversion unit based on the rotational velocity of the rotor to regulate an output voltage frequency when the doubly-fed induction machine is used as a generator.

15. The system of claim 11, wherein to adjust the operation of the doubly-fed induction machine, the controller is further programmed to:

configure the doubly-fed induction machine to have four effective poles using the power conversion unit and the relay unit based on the rotational velocity of the rotor to regulate an output voltage frequency when the doubly-fed induction machine is used as a generator; and configure the doubly-fed induction machine to have eight effective poles using the power conversion unit and the relay unit based on the rotational velocity of the rotor to regulate an output voltage frequency when the doubly-fed induction machine is used as a generator.

16. The system of claim 15, wherein configure the doubly-fed induction machine to have four effective poles, the controller is further programmed to:

configure the relay unit to:

electrically connect the first terminal of the first stator winding coil with the second output terminal and the first terminal of the sixth stator winding coil;

electrically connect the first terminal of the second stator winding coil with the third output terminal and the first terminal of the fifth stator winding coil electrically connect the first terminal of the third stator winding coil with the first output terminal and the first terminal of the fourth stator winding coil; and electrically connect the second terminal of the fourth stator winding coil to the second terminal of the fifth stator winding coil and the second terminal of the sixth stator winding coil.

17. The system of claim 15, wherein configure the doubly-fed induction machine to have eight effective poles, the controller is further programmed to:
configure the first inverter to:
excite the first rotor winding coil with a first sinusoidal current;
excite the second rotor winding coil with a second sinusoidal current, wherein the second sinusoidal current lags the first sinusoidal current by 120 degrees;
excite the third rotor winding coil with a third sinusoidal current, wherein the third sinusoidal current lags the second sinusoidal current by 120 degrees;
configure the second inverter to:
excite the fourth rotor winding coil with the first sinusoidal current;
excite the fifth rotor winding coil with the second sinusoidal current;
excite the sixth rotor winding coil with the third sinusoidal current; and
configure the relay unit to:
electrically connect the first terminal of the first stator winding coil with the third output terminal and the second terminal of the sixth stator winding coil;
electrically connect the first terminal of the second stator winding coil with the second output terminal and the second terminal of the fifth stator winding coil
electrically connect the first terminal of the third stator winding coil with the first output terminal and the second terminal of the fourth stator winding coil; and
electrically connect the first terminal of the fourth stator winding coil to the first terminal of the fifth stator winding coil and the first terminal of the sixth stator winding coil.

18. An electric machine comprising:
a stator having a hollow cylindrical shape, the stator including:
a plurality of stator slots disposed at a uniform pitch along a circumference of the stator;
a first, second, third, fourth, fifth, and sixth stator coil, wherein each stator coil has a first stator coil loop electrically connected in series to a second stator coil loop; and
wherein for each of the first, second, third, fourth, fifth, and sixth stator coil:
the first stator coil loop is disposed in a first pair of stator slots, wherein a center of the first stator coil loop is substantially coincident with the circumference of the stator, and wherein a second pair of stator slots is disposed between the first pair of stator slots; and
the second stator coil loop is disposed in a third pair of stator slots, wherein a center of the second stator coil loop is substantially coincident with the circumference of the stator, wherein a fourth pair of stator slots is disposed between the third pair of stator slots, and wherein the third pair of stator slots are diametrically opposed to the first pair of stator slots such that the second stator coil loop is diametrically opposed to the first stator coil loop; and
a rotor disposed rotatably inside the stator along a central axis of the stator, the rotor including:
a plurality of rotor slots disposed at a uniform pitch along a circumference of the rotor;
a first, second, third, fourth, fifth, and sixth rotor coil, wherein each rotor coil has a first rotor coil loop electrically connected in series to a second rotor coil loop; and
wherein for each of the first, second, third, fourth, fifth, and sixth rotor coil:
the first rotor coil loop is disposed in a first pair of rotor slots, wherein a center of the first rotor coil loop is substantially coincident with the circumference of the rotor, and wherein a second pair of rotor slots is disposed between the first pair of rotor slots; and
the second rotor coil loop is disposed in a third pair of rotor slots, wherein a center of the second rotor coil loop is substantially coincident with the circumference of the rotor, wherein a fourth pair of rotor slots is disposed between the third pair of rotor slots, and wherein the third pair of rotor slots are diametrically opposed to the first pair of rotor slots such that the second rotor coil loop is diametrically opposed to the first rotor coil loop.

19. The electric machine of claim 18, further including a controller affixed to an exterior surface of the stator, wherein the controller is programmed to:
determine a rotational velocity of the rotor; and
electrically change a pole number of the rotor and the stator based at least in part on the rotational velocity of the rotor by adjusting a phase angle of each phase of a three-phase current supply electrically connected to the rotor coils and changing a plurality of electrical connections between each of the stator coils.

* * * * *